United States Patent
Gu

(10) Patent No.: US 9,035,592 B2
(45) Date of Patent: May 19, 2015

(54) APPARATUS AND METHOD FOR CONTROLLING SPEED OF MOTOR

(71) Applicant: Samsung Electro-Mechanics Co., Ltd., Gyeonggi-do (KR)

(72) Inventor: Bon Young Gu, Gyeonggi-do (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 148 days.

(21) Appl. No.: 13/831,048

(22) Filed: Mar. 14, 2013

(65) Prior Publication Data

US 2014/0062370 A1 Mar. 6, 2014

(30) Foreign Application Priority Data

Sep. 5, 2012 (KR) .................. 10-2012-0098211

(51) Int. Cl.
- *H02P 23/00* (2006.01)
- *H02P 6/16* (2006.01)
- *G05B 11/28* (2006.01)
- *G01P 3/481* (2006.01)
- *G01P 21/02* (2006.01)

(52) U.S. Cl.
CPC .............. *H02P 23/0068* (2013.01); *H02P 6/16* (2013.01); *G05B 11/28* (2013.01); *G01P 3/481* (2013.01); *G01P 21/02* (2013.01)

(58) Field of Classification Search
CPC .................................................. H02P 23/0068
USPC .................... 318/461, 445, 255, 257
See application file for complete search history.

(56) References Cited

U.S. PATENT DOCUMENTS

| | | | | |
|---|---|---|---|---|
| 6,563,284 | B2 * | 5/2003 | Teutsch et al. | 318/599 |
| 7,141,943 | B2 * | 11/2006 | Song et al. | 318/400.34 |
| 7,834,565 | B2 * | 11/2010 | Armstrong | 318/254.1 |
| 7,889,977 | B2 * | 2/2011 | Strike et al. | 388/804 |

FOREIGN PATENT DOCUMENTS

| | | |
|---|---|---|
| JP | 2002-272160 | 9/2002 |
| JP | 2003-204692 | 7/2003 |
| JP | 2008148542 | 6/2008 |
| JP | 2009-065752 | 3/2009 |
| KR | 1020100041794 A | 4/2010 |
| KR | 1020100108676 A | 10/2010 |

OTHER PUBLICATIONS

KR 10-2012-0098211 Notice of Allowance dated Oct. 2, 2013.

\* cited by examiner

*Primary Examiner* — David S Luo
(74) *Attorney, Agent, or Firm* — Bracewell & Giuliani LLP; Brad Y. Chin

(57) ABSTRACT

Disclosed herein are an apparatus and a method for controlling a speed of a motor. An apparatus for controlling a spaced of a motor according to an exemplary embodiment of the present invention includes: a PWM conversion unit detecting a hall sensor signal from a motor to output a pulse width modulated signal corresponding to the detected hall sensor signal; a duty detection unit detecting a duty value of the pulse width modulated signal output by the PWM conversion unit; an error calculation unit comparing a PWM duty input from the outside with a duty detected by the duty detection unit to obtain an error; and a speed control unit controlling a speed of a motor based on an error obtained by the error calculation unit.

10 Claims, 2 Drawing Sheets

APPARATUS AND METHOD FOR CONTROLLING SPEED OF MOTOR

CROSS REFERENCE(S) TO RELATED APPLICATIONS

This application claims the benefit under 35 U.S.C. Section 119 of Korean Patent Application Serial No. 10-2012-0098211 entitled "Apparatus And Method For Controlling Speed Of Motor" filed on Sep. 5, 2012, which is hereby incorporated by reference in Its entirety into this application.

BACKGROUND OF THE INVENTION

1. Technical Field

The present invention relates to an apparatus and a method for controlling a speed of a motor, and more particularly, to an apparatus and a method for controlling a speed of a motor capable of reducing a time delay due to a speed detection calculation and an error in a detection speed due to the time delay, in a speed detection method of a revolution per minute (RPM) type according to the related art.

2. Description of the Related Art

Various configurations of a motor control circuit have been known. One of the configurations is the very H-bridge or full bridge configuration. In the H-bridge or full-bridge configuration, four transistors form an H pattern, together with a motor coil connected so as to form a H-shaped bridge. Transistor switches are formed in pair and are controlled. When a first switch pair is conducted, a first voltage signal is applied to the motor coil to generate current flowing in a first direction to the coil and when a second switch pair is conducted, a second voltage signal is applied to the motor coil to generate current flowing in an opposite direction to the coil. A speed of a motor is controlled according to a turn-on/off ratio of the transistor pairs.

Meanwhile, FIG. 1 is a diagram schematically illustrating a configuration of an example of an apparatus for controlling a speed of a motor according to the related art.

Referring to FIG. 1, an apparatus for controlling a speed of a motor according to the related art is configured to include; a speed conversion unit 110 that converts a speed indication (command) having a pulse width modulation (PWM) duty type supplied from the outside into an actual speed value (RPM value); a speed detection unit 120 that detects the actual speed of the motor 150; an error calculation unit 130 that calculates a difference (error) between the speed detected by the speed detection unit 120 and the speed converted from the PWM duty value by the speed conversion unit 110, and a speed control unit 140 that applies a new speed indication value to the motor 150 based on the speed error obtained by the error calculation unit 130.

In the apparatus for controlling a speed of a motor according to the related art having the configuration as described above, the calculation for speed detection is performed by periodically obtaining a sample for speed detection at the time of detecting the speed of the motor 150 by the speed detection unit 120. Therefore, the time delay for speed detection calculation occurs and thus, the error in the detection speed value occurs.

RELATED ART DOCUMENT

Patent Document (Patent Document 1) Korea Patent Laid-Open Publication No. 10-2010-0041794

(Patent Document 2) JP Patent Laid-open Publication No. 2008-148542

SUMMARY OF THE INVENTION

The present invention has proposed to improve a problem of a method for controlling a speed of a motor according to related art. An object of the present invention is to provide an apparatus and a method for controlling a speed of a motor capable of reducing a time delay due to a speed detection calculation and an error in a detection speed due to the time delay, in a speed detection method of a revolution per minute (RPM) type according to the related art, by performing a speed detection of a motor in a pulse width modulation (PWM) type to detect a duty and comparing the detected duty with a duty given as a speed indication (command) to obtain an error.

According to an exemplary embodiment of the present invention, there is provided an apparatus for controlling a speed of a motor, including: a PWM conversion unit detecting a hall sensor signal from a motor to output a pulse width modulated signal corresponding to the detected hall sensor signal; a duty detection unit detecting a duty value of the pulse width modulated signal output by the PWM conversion unit; an error calculation unit comparing a PWM duty input from the outside with a duty detected by the duty detection unit to obtain an error; and a speed control unit controlling a speed of a motor based on an error obtained by the error calculation unit.

The PWM conversion unit may output a pulse width modulated high or low signal.

The PWM conversion unit may detect a rising or falling edge of the hall sensor signal.

The PWM conversion unit may output a high or low signal for a preset time from an instant detected by the rising or fall edge of the hall sensor signal.

The speed control unit may apply a new speed indication value to the motor based on the error obtained by the error calculation unit.

According to another exemplary embodiment of the present invention, there is provided a method for controlling a speed of a motor by an apparatus for controlling a speed of a motor including a PWM conversion unit, a duty detection unit, an error calculation unit, and a speed control unit, the method including: a) detecting a hall sensor signal from a motor to be controlled by the PWM conversion unit to output the pulse width modulated signal corresponding to the detected hall sensor signal; b) detecting, by the duty detection unit, a duty value of the pulse width modulated signal output by the PWM conversion unit; c) obtaining, by the error calculation unit, an error by comparing a PWM duty input from the outside with a duty detected by the duty detection unit; and d) controlling, by the speed control unit, the speed of a motor based on the error obtained by the error calculation unit.

In the step a), the PWM conversion unit may output a pulse width modulated high or low signal.

In the step a), the PWM conversion unit may detect a rising or falling edge of the hall sensor signal.

The PWM conversion unit may output a high or low signal for a preset time from an instant detected by the rising or fall edge of the hall sensor signal.

In the step d), the speed control unit may apply a new speed indication value to the motor based on the error obtained by the error calculation unit.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Throughout the specification, unless explicitly described otherwise, "comprising" any components will be understood to imply the inclusion of other components but not the exclusion of any other components. In addition, a term "part", "module", "unit", or the like, described in the specification means a unit of processing at least one function or operation and may be implemented by hardware or software or a combination of hardware and software.

Hereinafter, exemplary embodiments of the present invention will be described in detail with reference to the accompanying drawings.

Figure 1:
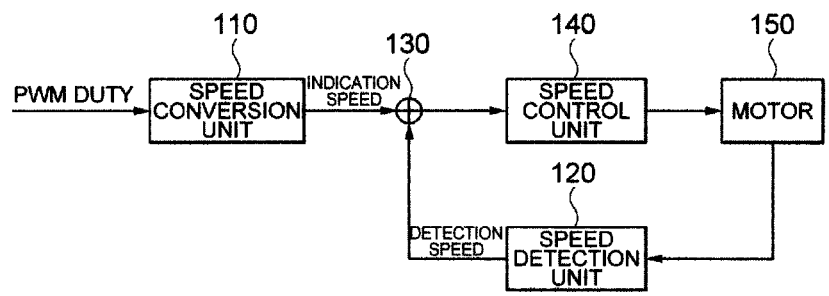
FIG. 1 is a diagram schematically illustrating a configuration of an example of an apparatus for controlling a speed of a motor according to the related art.
Figure 2:
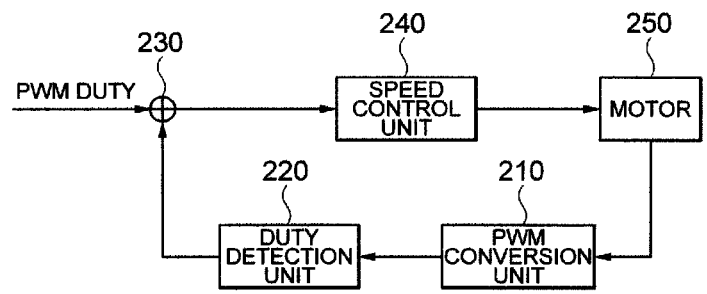
FIG. 2 is a diagram schematically illustrating a configuration of an apparatus for controlling a speed of a motor according to an exemplary embodiment of the present invention.

FIG. 2 is a diagram schematically illustrating a configuration of an apparatus for controlling a speed of a motor according to an exemplary embodiment of the present invention.

Referring to FIG. 2, the apparatus for controlling a speed of a motor according to the exemplary embodiment of the present invention is configured to include a PWM conversion unit 210, a duty detection unit 220, an error calculation unit 230, and a speed control unit 240.

The PWM conversion unit 210 detects a hall sensor signal (or a waveform of counter electromotive force) from a motor 250 to output a pulse width modulated signal corresponding thereto. In this configuration, in order for the PWM conversion unit 210 to detect the hall sensor signal from the motor 250, the motor 250 is previously provided with a hall sensor (not illustrated). In addition, when the motor 250 is previously provided with the hall sensor, the motor merely includes a circuit so that the PWM conversion unit 210 can receive a signal that is output from the hall sensor.

As described above, when the PWM conversion unit 210 detects the hall sensor signal (or a waveform of counter electromotive force) and outputs the pulse width modulated signal corresponding thereto, a pulse width modulated high or low signal is output.

In addition, the PWM conversion unit 210 detects a rising or falling edge of the hall sensor signal.

Further, the PWM conversion unit 210 outputs the high or low signal for a preset time, starting from an instant at which the rising or falling edge of the hall sensor signal is detected.

That is, when the PWM conversion unit 210 uses the hall sensor signal, the PWM conversion unit 210 detects the rising edge or the failing edge of the hall sensor signal and outputs the high signal and the low signal from the detected instant, starting from the specific time. Next, the high signal is again output and the low signal is output, for a specific time at the next edge. As described above, when a duty value of the converted PWM conversion unit 210 is detected, the detected duty value becomes a duty value corresponding to the speed.

Meanwhile, the duty detection unit 220 detects the pulse width modulated signal output by the PWM conversion unit 210, that is, the duty value of the pulse width modulated high or low signal. For example, when one period of the pulse width modulated signal is set to be 50 μs and time in which the signal is high or low is set to be 25 μs, the duty value of the pulse width modulated high or low signal becomes (25 μs/50 μs)×100%=50%. In this way, the duty detection unit 220 detects (calculate) the duty value of the pulse width modulated signal (that is, the pulse width modulated high or low signal) that is output by the PWM conversion unit 210.

The error calculation unit 230 compares the PWM duty input from the outside with the duty detected by the duty detection unit 220 to obtain the error between the two duties.

In addition, the speed control unit 240 controls the speed of the motor 250 based on the error (duty error) obtained by the error calculation unit 230. For example, the speed control unit 240 applies a new speed indication value to the motor 250 based on the error (duty error) obtained by the error calculation unit 230.

Hereinafter, the method for controlling a speed of a motor by the apparatus for controlling a speed of a motor according to the exemplary embodiment of the present invention having the foregoing configuration will be described.

Figure 3:
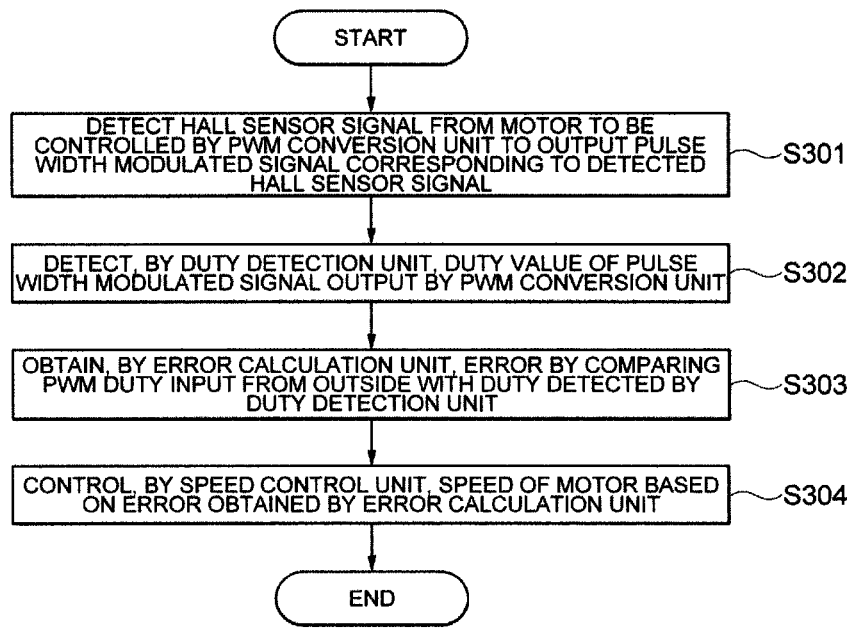
FIG. 3 is a flow chart illustrating a process of executing a method for controlling a speed of a motor according to an exemplary embodiment of the present invention.

FIG. 3 is a flow chart illustrating a process of executing a method for controlling a speed of a motor according to an exemplary embodiment of the present invention.

Referring to FIG. 3, a method for controlling a speed of a motor according to the exemplary embodiment of the present invention is a method for controlling a speed of a motor by an apparatus for controlling a speed of a motor including a PWM conversion unit 210, a duty detection unit 220, an error calculation unit 230, and a speed control unit 240 as described above. The method for controlling a speed of a motor first detects the hall sensor signal (or a waveform of counter electromotive force) of the motor 250 to be controlled by the PWM conversion unit 210 and outputs the pulse width modulated signal corresponding thereto (S301). Here, the pulse width modulated high or low signal is output by the PWM conversion unit 210.

In addition, in S301, the rising or falling edge of the hall sensor signal is detected by the PWM conversion unit 210.

In this case, the PWM conversion unit 210 outputs the high or low signal for the preset time, starting from the instant at which the rising or falling edge of the hall sensor signal is detected.

In this way, when the pulse width modulated signal is output by the PWM conversion unit 210, the duty value of the pulse width modulated signal output by the PWM conversion unit 210 is detected by the duty detection unit 220 (S302). Herein, the detecting of the duty value is described above and therefore, the description thereof will be omitted.

When the duty value of the pulse width modulated signal is detected by the duty detection unit 220, the PWM duty input from the outside compares with the duty detected by the duty detection unit 220 by the error calculation unit 230 to obtain the error between two duties (S303).

Next, the speed control unit 240 controls the speed of the motor 250 based on the error (duty error) obtained by the error calculation unit 230 (S304). That is, the speed control unit 240 applies the new speed indication value to the motor 250 based on the error (duty error) obtained by the error calculation unit 230. Therefore, the motor 250 controls the rotation speed according to the applied new speed indication value.

As described above, the apparatus and method for controlling a speed of a motor according to the exemplary embodiments of the present invention can reduce a time delay due to the speed detection calculation and an error in the detection speed due to the time delay, in the speed detection method of the RPM type according to the related art, by performing the speed detection of the motor in the pulse width modulation (PWM) type to detect the duty and comparing the detected duty with the duty given as the speed indication (command) to obtain an error.

As described above, the present invention will be described with reference to the exemplary embodiments, but is not limited thereto. It can be apparent to those skilled in the art that the exemplary embodiments of present invention can be variously changed and applied within the scope of the present invention without departing from the technical idea of the present invention. Therefore, the protection scope of the present invention must be construed by the appended claims and it should be construed that all spirits within a scope equivalent thereto are included in the appended claims of the present invention.

What is claimed is:

1. An apparatus for controlling a motor speed, comprising:
   a PWM conversion unit detecting a hall sensor signal from a motor and outputting a pulse width modulated signal corresponding to the detected hall sensor signal to perform a speed detection of a motor in a pulse width modulation type;
   a duty detection unit detecting a duty value of the pulse width modulated signal output by the PWM conversion unit;
   an error calculation unit comparing a PWM duty input from the outside with a duty detected by the duty detection unit to obtain an error; and
   a speed control unit controlling a speed of a motor based on an error obtained by the error calculation unit.

2. The apparatus according to claim 1, wherein the PWM conversion unit outputs a pulse width modulated high or low signal.

3. The apparatus according to claim 1, wherein the PWM conversion unit detects a rising or falling edge of the hall sensor signal.

4. The apparatus according to claim 3, wherein the PWM conversion unit outputs a high or low signal for a preset time from an instant detected by the rising or fall edge of the hall sensor signal.

5. The apparatus according to claim 1, wherein the speed control unit applies a new speed indication value to the motor based on the error obtained by the error calculation unit.

6. A method for controlling a speed of a motor by an apparatus for controlling a speed of a motor including a PWM conversion unit, a duty detection unit, an error calculation unit, and a speed control unit, the method comprising:
   a) detecting a hall sensor signal from a motor and outputting the pulse width modulated signal corresponding to the detected hall sensor signal to perform a speed detection of a motor in a pulse width modulation type, by the PWM conversion unit;
   b) detecting, by the duty detection unit, a duty value of the pulse width modulated signal output by the PWM conversion unit;
   c) obtaining, by the error calculation unit, an error by comparing a PWM duty input from the outside with a duty detected by the duty detection unit; and
   d) controlling, by the speed control unit, the speed of a motor based on the error obtained by the error calculation unit.

7. The method according to claim 6, wherein in the step a), the PWM conversion unit outputs a pulse width modulated high or low signal.

8. The method according to claim 6, wherein in the step a), the PWM conversion unit detects a rising or falling edge of the hall sensor signal.

9. The method according to claim 8, wherein the PWM conversion unit outputs a high or low signal for a preset time from an instant detected by the rising or fall edge of the hall sensor signal.

10. The method according to claim 6, wherein in the step d), the speed control unit applies a new speed indication value to the motor based on the error obtained by the error calculation unit.

* * * * *